UNITED STATES PATENT OFFICE.

ROBERT SCHMIDLIN, OF HÖCHST-ON-THE-MAIN, GERMANY, ASSIGNOR TO FARBWERKE VORM. MEISTER, LUCIUS & BRÜNING, OF HÖCHST-ON-THE-MAIN, GERMANY, A CORPORATION OF GERMANY.

PROCESS OF PRODUCING PHENYLGLYCIN AND ITS HOMOLOGUES.

No. 868,294.       Specification of Letters Patent.      Patented Oct. 15, 1907.

Application filed May 23, 1906. Serial No. 318,297.

*To all whom it may concern:*

Be it known that I, ROBERT SCHMIDLIN, chemist, a citizen of the Swiss Republic, residing at Höchst-on-the-Main, Germany, have invented certain new and useful Improvements in the Process for Producing Phenylglycin and its Homologues, of which the following is a specification.

By the usual process for obtaining phenylglycin by the action of chloracetic acid on an excess of anilin, or of anilin in presence of agents capable of combining with hydrochloric acid, like alkalies or acetates, poor yields are obtained owing to formation of by-products from the action of chloracetic acid on the phenylglycin produced.

According to the present invention good yields may be obtained, if care be taken that when the glycin or its homologues be formed it is separated as an insoluble salt of a heavy metal so that it is no longer liable to the further action of the chloracetic acid.

The process may be carried out, for instance, as follows: Chloracetic acid is allowed to act on anilin in presence of ferrous hydrate, or in presence of ferrous carbonate, and a concentrated salt solution; the phenylglycin iron salt thus formed is insoluble in a hot concentrated salt solution and may be filtered and decomposed by caustic alkali or alkali carbonate.

The following example illustrates the invention, but it is capable of variation both as regards the proportions and the details thereof: 1250 kilos of ferrous chlorid are dissolved in water and precipitated with the requisite quantity of soda lye or sodium carbonate, whereupon preferably 300 kilos of common salt are added and the mixture heated to from 90–100° C., 472 kilos of chloracetic acid being then added and the whole is stirred once and 510 kilos of anilin are rapidly introduced, whereupon the whole is heated under a reflux condenser for one hour and a half. When cold, the phenylglycin iron salt thus obtained is filtered, washed with some cold water, stirred with water and decomposed with soda lye or sodium carbonate. The mass is made to boil by steam and the unchanged anilin is distilled or filtered off. The ferrous oxid or ferrous carbonate is separated by filtration and the phenylglycin is precipitated from the filtrate by carefully adding dilute mineral acid. In a like manner homologues of phenylglycin, such as tolylglycin, are obtained, if for the anilin in the example be substituted the equivalent quantity of the homologue, such as a toluidin.

Having described my invention, what I claim is:—

The herein described process of making phenylglycin and its homologues, which consists in causing primary anilin bases to interact in the heat with chloracetic acid in presence of ferrous hydrate and a saturated indifferent alkali salt solution.

In testimony, that I claim the foregoing as my invention, I have signed my name in presence of two subscribing witnesses.

ROBERT SCHMIDLIN.

Witnesses:
JEAN GRUND,
CARL GRUND.